J. W. DUNCAN.
PORTABLE MIRROR.
APPLICATION FILED JUNE 25, 1918.
1,289,130.
Patented Dec. 31, 1918.
2 SHEETS—SHEET 1.
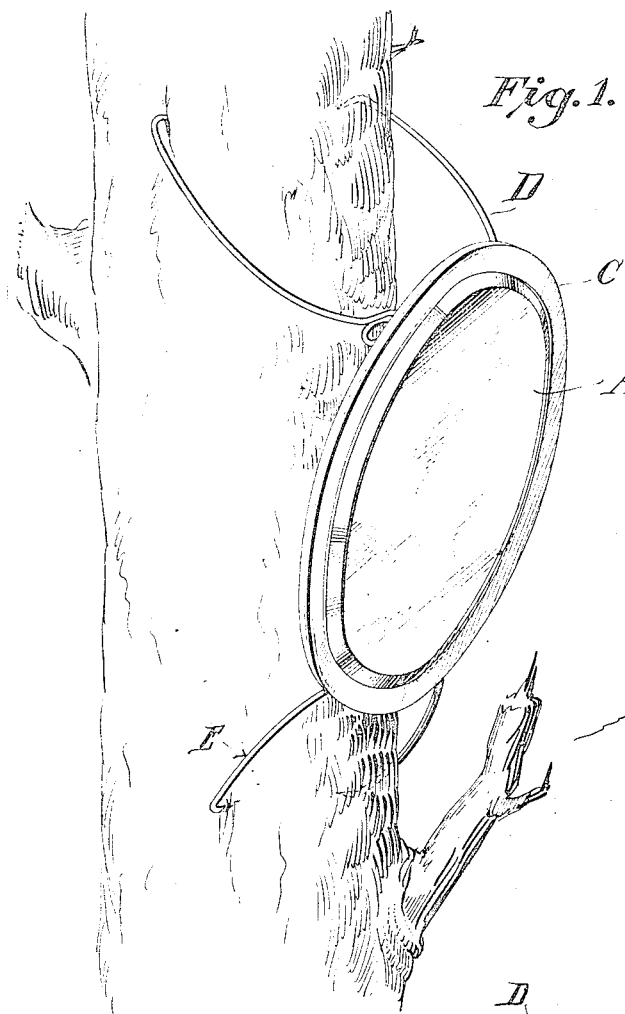
Fig. 1.
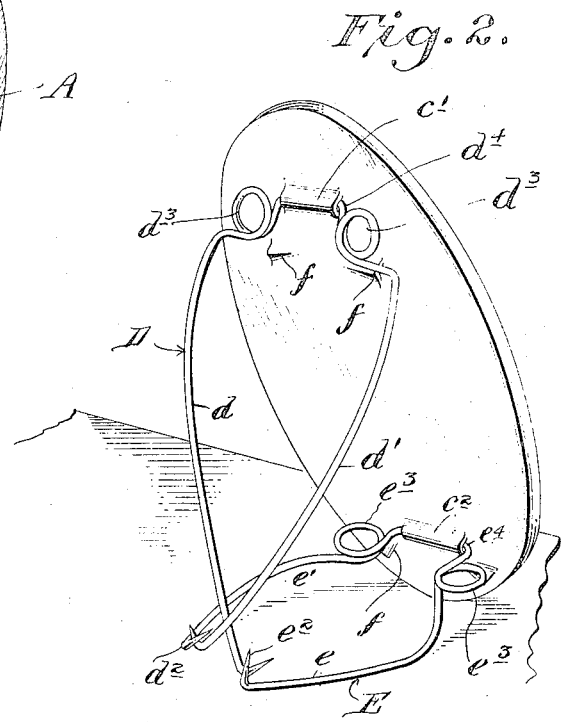
Fig. 2.
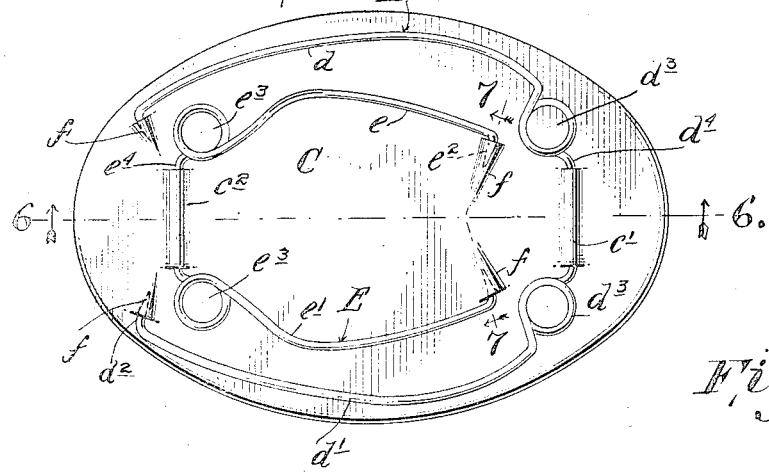
Fig. 3.
Witness
Inventor
J. W. Duncan
By his Attorneys
Baldwin & Wight

J. W. DUNCAN.
PORTABLE MIRROR.
APPLICATION FILED JUNE 25, 1918.

1,289,130.

Patented Dec. 31, 1918.
2 SHEETS—SHEET 2.

Witness

Inventor
J. W. Duncan
By his Attorneys
Baldwin Wight

UNITED STATES PATENT OFFICE.

JOHN W. DUNCAN, OF GREENWOOD, MISSISSIPPI.

PORTABLE MIRROR.

1,289,130.

Specification of Letters Patent.   Patented Dec. 31, 1918.

Application filed September 25, 1918.   Serial No. 255,693.

*To all whom it may concern:*

Be it known that I, JOHN W. DUNCAN, a citizen of the United States, residing in Greenwood, in the county of Leflore and State of Mississippi, have invented certain new and useful Improvements in Portable Mirrors, of which the following is a specification.

The object of this invention is to provide a mirror of such size that it may be conveniently carried from place to place, and which is equipped with devices of such kind that it may readily be placed or secured in position for use.

In accordance with my invention, I provide supports on the mirror which are collapsible and extensible in such manner that they may be confined in a small space or may be extended in such a way that they may support the mirror on a table or other similar piece of furniture or may be attached to a tree, post or other upright support.

My improvements are illustrated in the accompanying drawings in which:

Figure 1 is a perspective view of a mirror equipped with my improvements and attached to a tree.

Fig. 2 is a perspective view of the mirror resting on a horizontal support.

Fig. 3 is a plan view of the rear side of the mirror with its supports folded.

Figure 6:
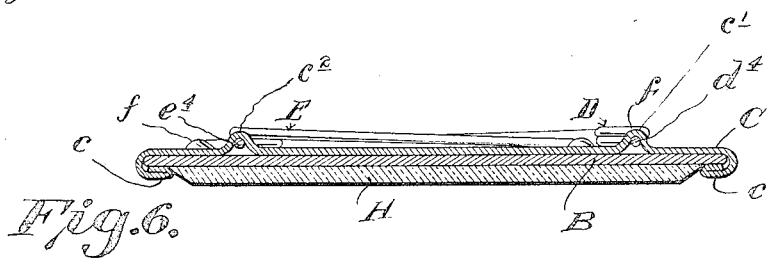
Fig. 6 shows a longitudinal section on the line 6—6 of Fig. 3.
Figure 7:
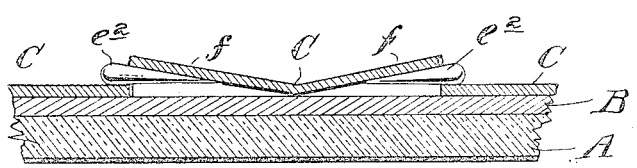
Fig. 7 shows a transverse section on the line 7—7 of Fig. 3.

The mirror shown in Figs. 1, 2, 3, 6, and 7 comprises a beveled glass A protected on its rear side by a sheet B of paper, wood or other suitable material and having a back C, preferably of metal, which is turned at its edges $c$ around the edges of the protecting sheet B, as clearly indicated in Fig. 6. Supports D and E are hinged to the back piece C of the mirror in such manner that they may be folded in the manner indicated in Fig. 3 so as to occupy a small space with the mirror or may be extended as illustrated in Figs. 1 and 2 to be either attached to an upright support, such as a tree, or supported on a horizontal object in the manner indicated in Fig. 2. The support D supports two arms $d$, $d'$ which are pointed at their outer ends as indicated at $d^2$. These arms are preferably made of wire and have a certain amount of resiliency, and preferably coils $d^3$ are formed in the arms to give them additional resiliency. A straight portion $d^4$ of the arms serves to connect them and this portion of the arms is hinged to the back piece C preferably by forming a loop $c'$ in the back piece which is bent around the part $d^4$ of the support. In this way the support as a whole may be turned so as to lie flat against the back of the mirror as indicated in Fig. 3 or set at any desired inclination as shown in Figs. 1 and 2. The support E is made somewhat shorter than the support D and comprises arms $e$, $e'$, having pointed ends $e^2$ and coils $e^3$. It also has a horizontal portion $e^4$ hinged to the back piece C by means of a loop $c^2$. When the supports are folded in the manner indicated in Fig. 3 the points of the arms may be housed or protected by housings $f$, as indicated in Fig. 3. These housings may be formed by slitting the metallic back piece C and bending the metal to form the housings in the manner clearly shown in the drawings. When the mirror is not in use or when it is desired to place it in a kit or suitcase or any other place for transportation or storage the supports D and E are folded and the points inserted in the housings $f$. When it is desired to use the mirror it may be supported on a table or other piece of furniture in the manner indicated in Fig. 2, the longer support D being placed at an inclination and the shorter support E being arranged horizontally or substantially so. At this time the points $d^2$, $e^2$ are made to interlock as shown in Fig. 2.

It is often desirable to attach the mirror to a tree, post or other object and this may be done in the manner indicated in Fig. 1, the two supports D and E being placed at the desired angle and the points of the supports being made to engage the tree or other objects.

A mirror of the kind above described and as is shown in the accompanying drawings is especially adapted for officers and soldiers in camp or for others in the open where trees or posts are the most readily accessible supports for the mirror. It may also be conveniently used by officers and sailors of the navy and by marines and also by travelers or tourists by rail or by water.

Figure 4:
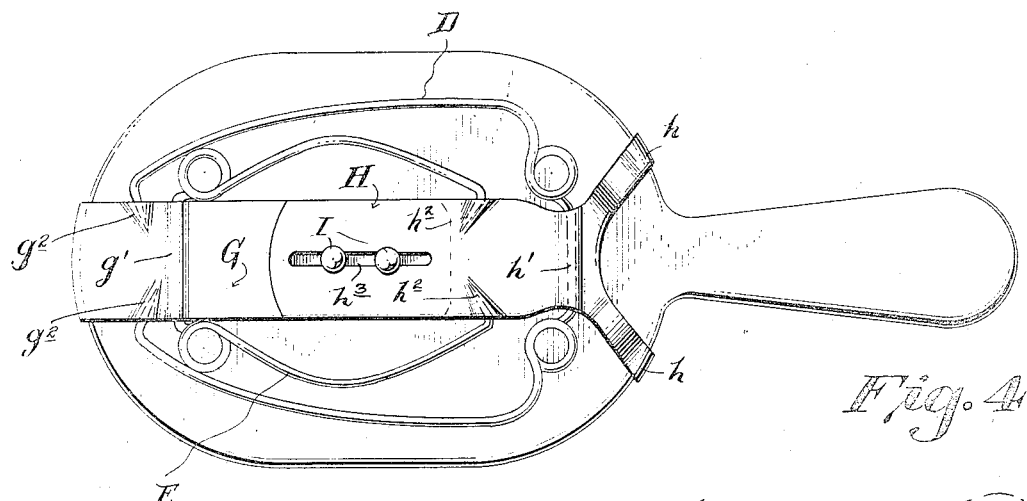
Fig. 4 is a plan view of a hand mirror to which is applied supports made in accordance with my invention.
Figure 5:
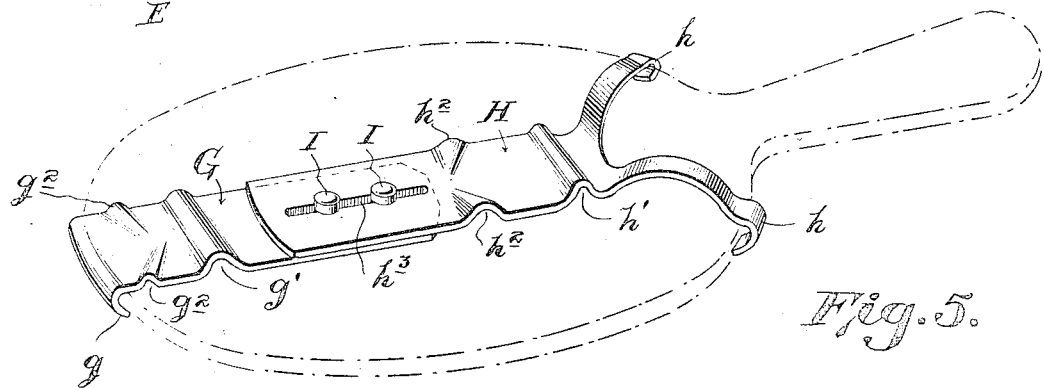
Fig. 5 is a perspective view of an adjustable, extensible, and collapsible frame for applying the supports to a mirror, a hand mirror being shown by dotted lines.

My improvements may be applied to mirrors of various kinds, such as hand mirrors, and may be adjustable to mirrors of different sizes. In Figs. 4 and 5 I have indicated how this may be done. In such case I provide a frame consisting of two members G, H. The member G is preferably made of sheet metal and it has a bent end $g$ adapted to engage the mirror at one end. It is also formed with a loop $g'$ adapted to receive one of the hinged supports and it is furthermore provided with housings $g^2$ to protect the points of one of the supports. The member H is formed with arms $h$ adapted to engage the mirror and with a loop $h'$ to receive that part of a support which is hinged to said member. It is likewise provided with housings $h^2$ for the pointed ends of one of the supports. The member H is slitted at $h^3$ and through these slits extend set screws I which engage the member G and are headed to engage the member H. By this construction the frame composed of the members G and H may be lengthened and shortened. The supports D and E are similar in all respects to those before described and are adjusted and operated in the same way.

The details of construction shown are those preferred but changes may be made therein without departing from the novel features of my invention.

I claim as my invention:

1. A mirror provided with a support, comprising two curved resilient arms hinged to the back of the mirror near one end, having pointed outer ends normally held close together by the resiliency of the arms, but which may be spread to engage a supporting object, said arms being normally held by their resiliency wholly within the field inclosed by the rim of the mirror.

2. A mirror provided near its upper and lower ends with supports each comprising two resilient arms hinged to the mirror, having pointed outer ends normally held close together by the resiliency of the arms, but which may be spread to engage a supporting object, each pair of arms being also normally held by their resiliency wholly within the field inclosed by the rim of the mirror.

3. A mirror provided with a support near one end, comprising two resilient arms having pointed outer ends normally held close together by the resiliency of the arms, but which may be spread to engage a supporting object while under tension, said arms being also normally held by their resiliency wholly within the field inclosed by the rim of the mirror and being constructed to automatically overlap each other at their outer ends when free to do so.

4. A mirror provided with a support, comprising two resilient arms hinged to the mirror, having pointed outer ends normally held close together by the resiliency of the arms, but which may be spread to engage a supporting object while under tension, said mirror being provided with housings which receive the pointed ends of the arms when said arms are folded against the back of the mirror.

5. A mirror provided with a support at one end, comprising two resilient arms hinged to the back of the mirror and having pointed outer ends normally held close together by the resiliency of the arms, but which may be spread to engage a supporting object while under tension, and a similar support hinged to the opposite end of the mirror, comprising two resilient arms of shorter length than those first mentioned and which have pointed outer ends normally held close together by the resiliency of the arms but which may be spread to engage a supporting object while under tension.

6. A mirror provided near one end with a support consisting of resilient pointed arms hinged to the back of the mirror, and provided at its opposite end with a similar support of less length than that first mentioned and similarly connected to the mirror, said supports being foldable one within the other and being extensible to any desired extent to hold the mirror at any desired inclination.

7. The combination with a mirror of a frame comprising two members adjustably connected to vary the length of the frame, and provided with means for securely holding the frame on the mirror, and supports for the mirror comprising resilient arms hinged to said frame near its opposite ends and having pointed ends for the purpose specified.

In testimony whereof, I have hereunto subscribed my name.

JOHN W. DUNCAN.